UNITED STATES PATENT OFFICE.

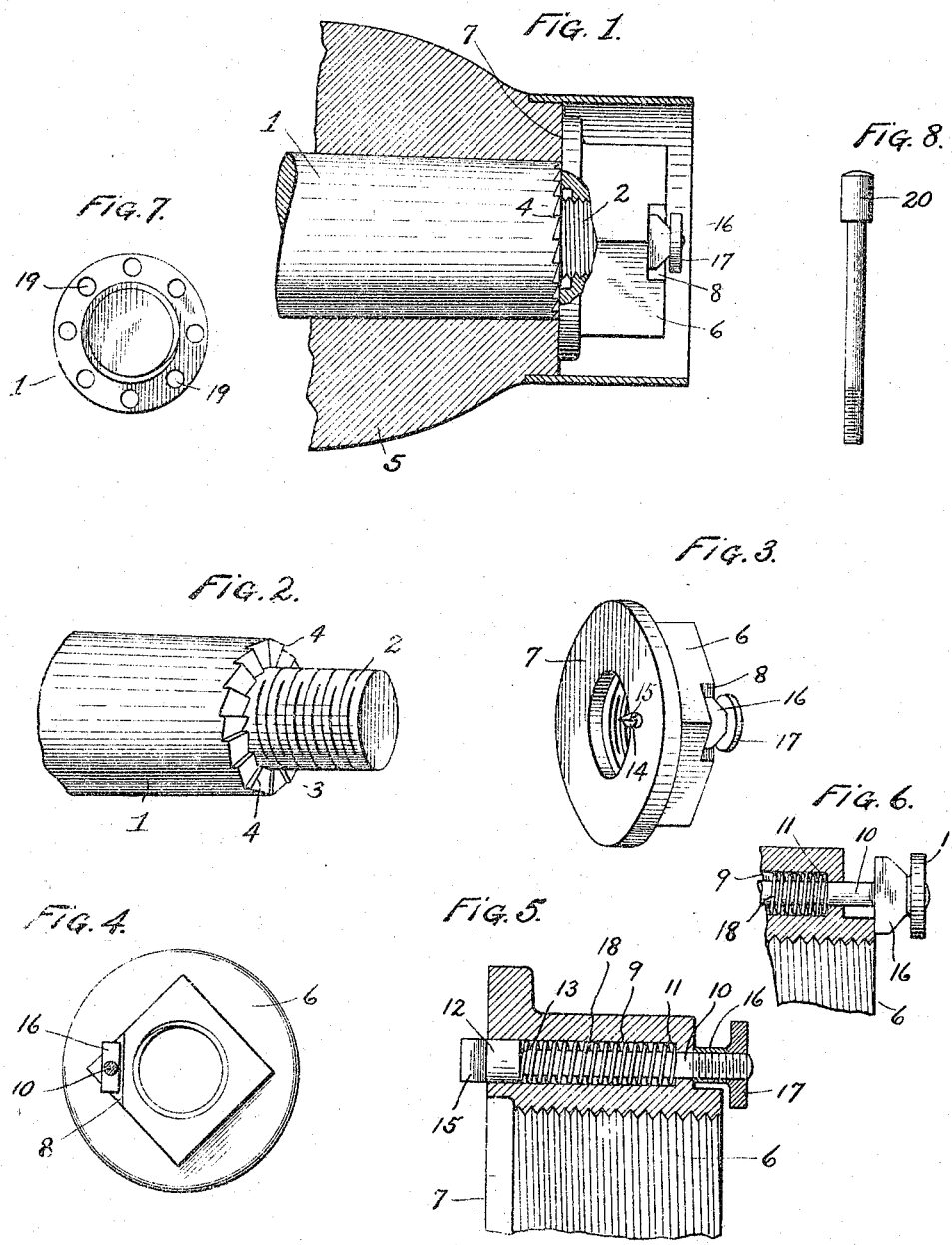

RICHARD T. FITZPATRICK, OF ST. LOUIS, MISSOURI, ASSIGNOR OF ONE-HALF TO JOHN H. MILLS, OF ST. LOUIS, MISSOURI.

LOCK-NUT FOR AXLES.

No. 881,676.　　　Specification of Letters Patent.　　　Patented March 10, 1908.

Application filed October 26, 1907. Serial No. 399,242.

*To all whom it may concern:*

Be it known that I, RICHARD T. FITZPATRICK, a citizen of the United States, residing in the city of St. Louis and State of Missouri, have invented new and useful Improvements in Lock-Nuts for Axles, of which the following is a specification.

This invention relates to certain new and useful improvements in nut locks, and has special reference to the provision of novel means for locking the nut on the end of the axle of a vehicle, although not limited in use to such application.

It is well known that accidents are frequently caused by the securing nut unscrewing from the axle, permitting the wheel to come off. The liability to accident from this cause is entirely obviated by my invention, which in a simple and economical manner provides for securely locking the nut on the axle, while at the same time it may be readily manipulated to enable the nut to be unscrewed, as when it is desired to remove the wheel from the axle to lubricate the parts.

The invention resides in the novel construction and arrangement of parts hereinafter described and particularly pointed out in the claims following the specification.

In the accompanying drawing, Figure 1 is a broken sectional elevation of the end of a vehicle axle having a wheel secured thereon by means of my improved nut; Fig. 2 is a perspective view of the end of the axle, the wheel and nut being removed; Fig. 3 is a similar view of a nut provided with my invention; Fig. 4 is a face view showing the outer side of the nut with my invention applied thereto; Fig. 5 is a broken sectional view showing the locking bolt in the position in which it would engage with the teeth on the axle; Fig. 6 is a similar view showing the position of the retracted locking bolt, in which position it would not engage with the teeth on the axle; Fig. 7 is an end view of the axle showing its flange provided with holes instead of teeth; and Fig. 8 shows the form of pin which would be used with this modification.

Referring now to the drawing, 1 indicates the axle having an outer reduced screw-threaded end portion 2, as usual, and a shoulder 3, which is provided on its outer face with a series of teeth 4; 5 indicates the hub of a wheel adapted to be inserted on the axle 1; 6 a nut adapted to be screwed on the end 2 of the axle, and having a flange portion 7 for bearing on the end of the hub. The nut proper, which as usual is square, has a portion thereof cut away at one corner to any required depth, say, for example, a quarter of an inch, affording a flat face or shoulder 8. Adjacent to this shoulder a hole 9 is bored through the nut parallel with the axis thereof, said hole being for the reception of the locking bolt 10, and having two diameters, the hole of the smaller diameter opening through the outer face of the nut and providing a shoulder 11. The bolt has its inner end enlarged, as indicated at 12, to fit snugly the bore of the hole of larger diameter, and to provide a shoulder 13. The outer end of the enlarged portion 12 is suitably cut away on one side, as indicated at 14, to provide a flat surface for engaging against the face of the teeth 4, and is beveled on its other side, as indicated at 15, to facilitate the passage of the locking bolt over the teeth 4. The outer end of the bolt 10 is screw-threaded, and on its screw-threaded end is screwed a relatively narrow nut 16, having two flat parallel sides, and a jamb nut 17, which is circular and milled, or may be of any desired configuration to enable it to serve also as a thumb nut. When screwed together the nuts 16 and 17 will mutually act upon each other to maintain the nuts in fixed positions, as will be well understood.

Between the shoulder 11 provided on the interior of the hole 9 and the shoulder 13 on the bolt 10 is mounted a coil spring 18, which encircles the bolt 10, and tends normally to press the inner end of the same into engagement with the teeth 4 on the axle. In such normal position of the parts, as shown in Figs. 1 and 5, the nut 16 has one of its sides in engagement with, or in close proximity to, the shoulder 8 on the nut, thus preventing the bolt 10 from turning. When the bolt is to be retracted to permit the nut to be unscrewed, the operator grasps the thumb nut 17, pulls the bolt outward and then gives the same a half-turn, whereby the nut 16 will be caused to rest upon the outer face of the nut 6 and maintain the inner end of the bolt 10 out of engagement with the teeth 4. To prevent wear of parts the bolt may be thus retracted while the nut is being screwed on the axle, and after it is screwed home, or nearly so, the bolt may be released so that its inner end may come into engagement with the teeth 4; if not retracted before screwing on the nut its beveled side will ride over the teeth 4 until the nut is screwed home. It will be readily seen that after the nut is screwed home the locking bolt will engage one or the other of the teeth 4, and be held in such engagement by the spring 18 and that it will be impossible for said nut to unscrew by reason of such engagement.

In the modification shown in Fig. 7, I provide holes 19 at more or less frequent intervals in the face of the shoulder and employ a straight bolt 20, which is adapted to pass into one or the other of the said holes.

It will be readily seen that the locking nut can be employed with right or left hand threads, and that the direction in which the bolt passes through the nut may be changed to suit the construction of axle or nut, without departing from the spirit of my invention.

I claim:—

1. In combination with an axle having a screw-threaded end and an annular shoulder adjacent thereto and provided on its face with a number of stops, a nut for said axle having a spring controlled locking bolt mounted therein for engagement with said stops, said nut having a portion of its body cut away to form a shoulder, a nut mounted on said bolt and having a flat side bearing against said shoulder and a thumb nut also mounted on said bolt and adapted to be screwed into engagement with said first-named nut.

2. In combination with an axle having a screw-threaded end and an annular shoulder adjacent thereto provided with stops, a nut for said axle having a spring controlled locking bolt retractably mounted therein for engagement with said stops, said nut having a portion of its body cut away to provide a shoulder, a nut screwed on said bolt and having a flat side adapted to engage said shoulder, a thumb nut screwed onto said bolt and into engagement with said first-named nut, said bolt upon being retracted being adapted to be turned and have its nut engage the outer face of the axle nut, whereby to hold the bolt in a retracted position.

In testimony whereof I have hereunto set my hand in presence of two subscribing witnesses.

RICHARD T. FITZPATRICK.

Witnesses:
BRUCE S. ELLIOTT,
JOHN H. MILLS.